W. WINS, Jr.
NUT LOCK.
APPLICATION FILED NOV. 6, 1913.

1,177,980. Patented Apr. 4, 1916.

Witnesses

Inventor
William Wins, Jr.,
By
his Attorney

UNITED STATES PATENT OFFICE.

WILLIAM WINS, JR., OF LIVINGSTON, ALABAMA.

NUT-LOCK.

1,177,980. Specification of Letters Patent. Patented Apr. 4, 1916.

Application filed November 6, 1913. Serial No. 799,543.

*To all whom it may concern:*

Be it known that I, WILLIAM WINS, Jr., a citizen of the United States, residing at Livingston, in the county of Sumter and State of Alabama, have invented certain new and useful Improvements in Nut-Locks, of which the following is a specification.

This invention relates to nut locks of that type in which the nut will be positively locked on the bolt against reverse rotation for preventing the displacement of the same due to vibration or the like.

An object of the invention resides in the provision of a nut which although retained at a desired point on the bolt from reverse rotation, nevertheless will allow for the removal of the same from the bolt when so desired.

Other objects as well as the nature, characteristic features and scope of my invention will be more readily understood from the following description taken in connection with the accompanying drawings and pointed out in the claims forming a part of this specification.

Figure 1:
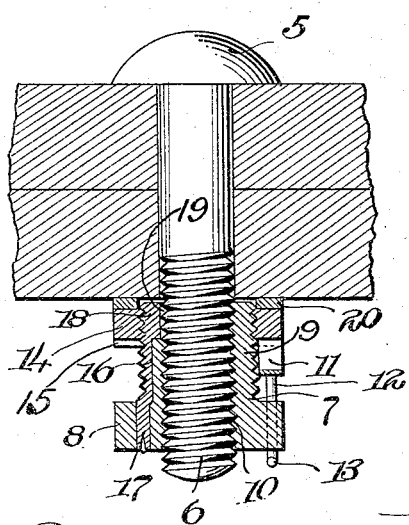
Figure 2:
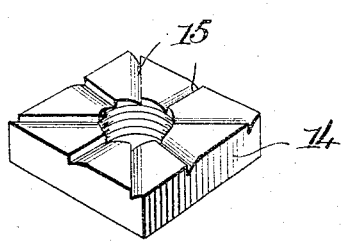
Figure 3:
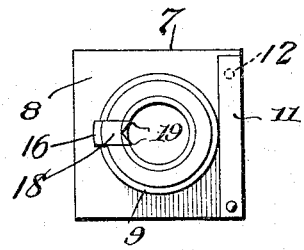
Figure 4:
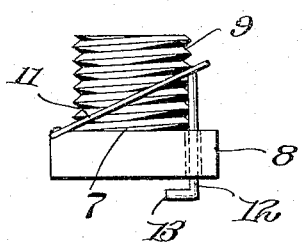

Referring to the drawings:—Figure 1 is a longitudinal sectional view of the device constructed in accordance with my invention showing the same applied to a bolt; Fig. 2 is a perspective view of the nut used in the present invention; Fig. 3 is a bottom plan view of the supplemental nut used in this invention; and Fig. 4 is a side elevation of the same.

In the drawings wherein is illustrated the preferred embodiment of this invention, a bolt 5 is provided which is of the ordinary or any desired form, in the present instance being provided with an ordinary externally screw threaded shank 6.

Mounted on the threaded shank 6 of the bolt 5 is my improved nut 7 which comprises a head 8 and an externally screw threaded sleeve 9 which is provided with internal threads 10. The head 8 of the nut 7 has mounted on the inner face thereof an elastic element 11 which in the present instance comprises a flat spring the one end of which is fixedly secured to the inner face of the head 8 while the opposite end thereof normally extends upwardly in spaced relation to the bolt 5 as shown to advantage in Fig. 4. Extending longitudinally through the head 8 and having engagement with the free end of the spring 11 is an operating member 12 which comprises a single strand of wire the one end of which is fixedly engaged with the free end of the spring while the opposite end 13 thereof is bent at a right angle to the body so as to provide a handle for facilitating the actuation of said elastic element.

Adapted for threaded engagement with the threaded sleeve 9 of the nut 7 is a nut 14 which is provided with an internally threaded bore and has one face thereof serrated as indicated at 15 which is engaged by the free end of the flat spring 11 so as to prevent the displacement of the same thereon.

A portion 16 of the threaded sleeve 9 of the supplemental nut 7 is detached and has one end thereof engaged in the head 8 of the nut as indicated at 17 by riveting the end thereof or the like, said end 17 being preferably angularly offset for a purpose which will subsequently appear. The opposite end 18 of the detached portion is preferably enlarged having a portion thereof extending radially inward and provided with longitudinally extending teeth 19 as advantageously illustrated in Fig. 3 which are adapted for biting engagement, at times, with the threaded shank 6 of the bolt 5. By angularly offsetting the end 17 of the locking member 16 to the body thereof it is obvious that the portion 18 at the opposite end thereof will normally lie beyond the outer periphery of the bolt as likewise advantageously illustrated in Fig. 3. If desired a spacing washer 20 made of leather, metal or any other suitable material may be interposed between the nut 14 and the element which is being secured so as to afford a space for the inner end of the sleeve 9 of the nut 7 to lie.

In operation the bolt 5 is passed through the object to be secured in the ordinary manner, and the spacing washer 20 will then engage with the element to be secured. The nut 14 is normally in a neutral position on said sleeve 9 at a point approximately intermediate the ends of the latter for a purpose which will hereinafter be set forth. The nut 7 is now threaded on the shank 6 of the bolt 5 until the inner end of said nut is engaged with the element to be secured. As soon as the desired adjustment of the supplemental nut 7 on the bolt 5 is made the nut 14 is actuated on the external screw threaded sleeve 9 of the nut 7 until the same engages with the spacing washer 20 as shown to advantage in Fig. 1, in which instance the teeth 19 will be forced into biting engagement with the externally screw threaded shank 6 of the bolt 5. During the operation of the nut 14 on the threaded sleeve 9 of the nut 7 the elastic element 11 is in engagement with the serrations 15 allowing for the free movement of the nut on the bolt, but positively preventing the reverse rotation of the same thereon as is obvious. Should it be desired to detach the auxiliary nut 7 from its engagement with the bolt 5 force withdrawing the handle 13 of the operating element 12 will cause the spring 11 to be disengaged from the serrations 15 allowing the nut 14 to be reversely turned on the threaded sleeve 9 of said auxiliary nut and threaded toward the head 8 thereof so as to allow the detached portion 16 to take its normal position and be disengaged from its engagement with the threaded shank 6. The auxiliary nut 7 is then unthreaded from the bolt 5 in the ordinary manner.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent is:—

1. A nut lock including a bolt, a nut carried on said bolt having a sleeve portion, a supplemental nut on the latter, locking means on the sleeve operable by said supplemental nut, an elastic element interposed between the head of said first mentioned nut and said supplemental nut and having engagement with the latter to prevent displacement of the same, and a handle means disposed through the head of the nut for actuating said elastic element.

2. A nut lock in combination with a bolt, a nut engaging with said bolt having a sleeve, a portion of said sleeved nut being movable and normally lying beyond the outer periphery thereof, a supplemental nut threaded on said sleeved nut for retaining, at times, said portion within the periphery of said sleeve, an elastic element carried by the head of said sleeved nut, an elastic element carried by the head of said sleeved nut and having engagement with the supplemental nut for holding the latter in a predetermined position, and means for actuating said element for disengaging the latter from said supplemental nut.

3. A nut lock in combination with a bolt, a nut threaded on said bolt and having a head, a portion of said nut being detached and having one end thereof offset and engaged in the head thereof, the opposite end of said portion being provided with longitudinally extending teeth on the one face thereof and external screw threads on the opposite face, said end having a portion thereof normally lying beyond the outer periphery of said nut, means movable on said nut for engaging said longitudinal teeth with said bolt proper, a spring interposed between said means and the head on said nut for retaining said means in a fixed position on said nut, and means for actuating said spring for disengaging the same from said first mentioned means.

4. A nut lock in combination with a bolt provided with an externally screw threaded shank, a sleeved nut on said bolt having a head, an externally screw threaded sleeve having an internally threaded bore, a portion of said nut being detachable and having one end thereof offset and engaged in the head of said bolt, said portion having one face thereof screw threaded conforming to the configuration of the external contour of said nut, the opposite end thereof being provided with longitudinally extending teeth on its inner face for engagement, at times, with the externally screw threaded shank of said bolt proper, a supplemental nut threaded on the external shank of said first-mentioned nut for engaging said longitudinally extending teeth, at times, with the external threads of said bolt proper, a flat spring the one end of which is in engagement with the inner face of the head of said nut and the opposite end thereof normally engaging said supplemental nut for holding the latter in a fixed position on said headed nut, and an operating member engaging through said head and with said spring for disengaging the same from said supplemental nut.

5. A nut lock in combination with a bolt provided with an externally screw threaded shank, a sleeved nut threaded on the shank of said bolt proper, said nut provided with a head and having the sleeve thereof externally screw threaded, said sleeve provided with an internally threaded bore, a portion of said sleeve being detached and having one end thereof offset and engaged in the head thereof, the opposite end of said portion being enlarged and provided with longitudinally extending teeth on its inner face, said enlarged end having a portion thereof normally extending beyond the periphery of the sleeve of said nut, a supplemental nut operable on the externally screw threaded sleeve of said first-mentioned nut for engaging said longitudinal teeth with the external threads of said bolt proper, said supplemental nut provided with serrations on the outer face thereof, a flat spring the one end of which is fixedly secured to the inner face of the head of said sleeved nut and the opposite end thereof normally extending in spaced relation thereto, and an operating member extending through the head of said sleeved nut and having engagement with said opposite end for the purpose set forth.

6. A nut lock in combination with a bolt having an externally threaded shank, a nut receivable on said threaded shank having an externally and internally threaded sleeve integrally formed therewith, a portion of said sleeve being detached therefrom and normally sprung from the periphery of said sleeve, one end of said portion being rigidly mounted in the head of said nut and the inner end being free, said inner end being enlarged and provided with teeth for engagement with the threaded shank of the bolt, at times, a supplemental nut on said sleeve, and adapted to embrace said spring portion of said sleeve, and means interposed between said supplemental nut and the head of the first-mentioned nut, whereby to prevent rotation of the parts on the bolt.

7. A nut lock, in combination with a bolt having a threaded extremity, a nut on said bolt having a sleeve portion, means permanently carried by the sleeve portion adapted to impinge upon and bite into the threads of the bolt to lock the nut, and means on said nut engaging and for forcing said locking means into locking position.

8. In a nut lock, the combination with a bolt having a threaded extremity, a nut on said bolt having an internally and exteriorly threaded sleeve, a locking member formed on the sleeve to engage the bolt, means actuatable on said sleeve to force said locking means into locked position, and means on the nut for locking the actuating means in a given position.

In testimony whereof I affix my signature in presence of two witnesses.

WILLIAM WINS, Jr.

Witnesses:
W. W. Patton,
W. G. Little.

Copies of this patent may be obtained for five cents each, by addressing the "Commissioner of Patents, Washington, D. C."